United States Patent
Zhang et al.

(10) Patent No.: US 11,584,871 B2
(45) Date of Patent: Feb. 21, 2023

(54) ACID RESISTANT ADHESIVE COMPOSITION

(71) Applicant: Henkel AG & Co. KGaA, Duesseldorf (DE)

(72) Inventors: Xinyu Zhang, Shanghai (CN); Qi Chen, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 54 days.

(21) Appl. No.: 16/913,135

(22) Filed: Jun. 26, 2020

(65) Prior Publication Data

US 2020/0325364 A1 Oct. 15, 2020

Related U.S. Application Data

(63) Continuation of application No. PCT/CN2017/119764, filed on Dec. 29, 2017.

(51) Int. Cl.
*C09J 111/00* (2006.01)
*C08K 3/22* (2006.01)
*C08K 5/5415* (2006.01)

(52) U.S. Cl.
CPC ........... *C09J 111/00* (2013.01); *C08K 3/22* (2013.01); *C08K 5/5415* (2013.01); *C08K 2003/222* (2013.01); *C08K 2003/2296* (2013.01)

(58) Field of Classification Search
CPC ............................ C09J 111/00; C08K 5/5415
See application file for complete search history.

(56) References Cited

U.S. PATENT DOCUMENTS

| | | | |
|---|---|---|---|
| 4,463,110 A | 7/1984 | Perlinski et al. | |
| 5,252,668 A | 10/1993 | Mori et al. | |
| 5,753,727 A | 5/1998 | Sato et al. | |
| 7,446,158 B2 | 11/2008 | Okamoto et al. | |
| 7,652,119 B2 | 1/2010 | Wakabayashi et al. | |
| 7,772,332 B2 | 8/2010 | Wakabayashi | |
| 8,043,747 B2 | 10/2011 | Suzuki et al. | |
| 10,581,032 B2 | 3/2020 | Muraki et al. | |
| 2006/0079645 A1 | 4/2006 | Hasegawa et al. | |
| 2010/0112441 A1 | 5/2010 | Fukumine et al. | |

FOREIGN PATENT DOCUMENTS

| | | | |
|---|---|---|---|
| CN | 1751099 A | 3/2006 | |
| CN | 1950459 A | 4/2007 | |
| CN | 101023543 A | 8/2007 | |
| CN | 101056946 A | 10/2007 | |
| CN | 101426859 A | 5/2009 | |
| CN | 101652884 A | 2/2010 | |
| CN | 102443089 A | 5/2012 | |
| CN | 103173134 A * | 6/2013 | |
| CN | 103351448 A | 10/2013 | |
| CN | 103897636 A * | 7/2014 | |
| CN | 104159958 A * | 11/2014 | ............ C08C 19/25 |
| CN | 106104843 A | 11/2016 | |
| CN | 106221614 A | 12/2016 | |
| EP | 0171986 A1 | 2/1986 | |
| JP | S4925032 A | 3/1974 | |
| JP | S57180672 A | 11/1982 | |
| JP | S62290781 A | 12/1987 | |
| JP | H05140522 A | 6/1993 | |
| JP | H08259916 A | 10/1996 | |
| JP | 2005133004 A | 5/2005 | |
| JP | 2013151585 A | 8/2013 | |

OTHER PUBLICATIONS

Machine translation of CN-103173134-A (Year: 2013).*
Machine translation of CN-104159958-A (Year: 2014).*
Machine translation of CN-103897636-A (Year: 2014).*
International Search Report for International PCT Patent Application No. PCT/CN2017/119764 dated Aug. 16, 2018.

* cited by examiner

*Primary Examiner* — Wenwen Cai
(74) *Attorney, Agent, or Firm* — James E. Piotrowski

(57) ABSTRACT

This invention relates to an acid resistant adhesive composition, comprising at least one polychloroprene; at least one epoxy silane; at least one amine silane; at least one unsaturated silane; and at least one organic solvent. The acid resistant adhesive composition according to the present invention exhibits excellent initial peel strength and final peel strength after being soaked in electrolyte solution and shows good acid resistant property.

11 Claims, No Drawings

ACID RESISTANT ADHESIVE COMPOSITION

TECHNICAL FIELD

This invention relates to an acid resistant adhesive composition, comprising at least one polychloroprene; at least one epoxy silane; at least one amine silane; at least one unsaturated silane; and at least one organic solvent. The acid resistant adhesive composition according to the present invention exhibits excellent initial peel strength and final peel strength after being soaked in electrolyte solution, and shows good acid resistant property.

BACKGROUND OF THE INVENTION

Lithium ion batteries have been widely used as rechargeable batteries in portable terminal devices such as cell phones, laptops, cameras and the like due to their high energy output despite their extremely thin shape and compact size.

One of the limitations for the development of the lithium ion battery is the packaging material to house the positive electrode, the negative electrode, the separator and electrolyte solution of the lithium ion battery. The electrolyte solution in the lithium ion battery typically contains lithium salts, such as LiPF6 and LiBF4, serving as electrolytes. In the presence of water, the lithium salts will be hydrolyzed to form hydrofluoric (HF) acid and cause corrosion to metal surfaces. Therefore, the packaging materials are commonly made of a polymer layer attached to a metal layer, such as a polyethylene (PE) layer or polypropylene (PP) layer attached to an aluminum layer or a nickel layer. The polymer layer functions as a protection layer for the metal layer against the corrosion of the electrolyte solution.

However, polymer materials usually have small polarizability and are extremely difficult to be adhered. In order to bond the polymer layer to the metal layer, the surface of the polymer layer is often required to be treated firstly. Chromate conversion treatment has been proven to be one of the most effective methods for this purpose. Grafting modification is also used to improve the bonding strength between polymer layer and metal layer. The polymer layer grafted with a polar monomer can have a higher surface polarity which will improve the adhesion strength between the polymer layer and the metal layer.

Although much progress has been made in the development of attaching a polymer layer to a metal layer, the peel strength between the two layers is not high enough to meet the demand of packaging materials used for lithium ion batteries. In addition, the process for the treatment of the surface of the polymer layer is also complicated and costly. Therefore, there is a need for developing an acid resistant adhesive composition for improving the bonding between the polymer layer and the metal layer and protecting the metal layer from the corrosion of the electrolyte solution.

SUMMARY OF THE INVENTION

The present invention relates to an acid resistant adhesive composition, comprising:
(a) at least one polychloroprene rubber;
(b) at least one epoxy silane;
(c) at least one amino silane;
(d) at least one unsaturated silane; and
(e) at least one organic solvent.

The acid resistant adhesive composition of the invention exhibits excellent initial peel strength and final peel strength after being soaked in electrolyte solution. Moreover, the final peel strength of the acid resistant adhesive composition does not drop much compared with the initial peel strength indicating the adhesive composition has good acid resistant property.

The present invention also relates to a method of preparing the acid resistant adhesive composition, which is carried out with nitrogen gas protection, comprising the steps of:
(a) milling polychloroprene rubber;
(b) heating the milled polychloroprene rubber with optionally added metallic oxide and forming polychloroprene rubber sheet by a roll mill;
(c) mixing organic solvent, unsaturated silane, and optionally added saturated silane to form a homogenous mixture;
(d) dissolving the polychloroprene rubber sheet from step (b) in the homogenous mixture from step (c) to form a solution;
(e) optionally adding tackifier, adhesion promoter, film forming agent and stabilizer into the solution;
(f) mixing epoxy silane and amine silane; and
(g) adding the mixture of epoxy silane and amine silane into the solution from step (d) or step (e).

The present invention also relates to an article bonded by the acid resistant adhesive composition.

The present invention also relates to a battery comprising the article.

The present invention also relates to a portable device or an electrical vehicle comprising the battery.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points. All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

Polychloroprene Rubber

The polychloroprene rubber of the present invention refers to chloroprene homopolymer and copolymer of chloroprene with another monomer copolymerizable with chloroprene. The other monomer copolymerizable with chloroprene for use in the invention includes but not limited to acrylic acid esters such as methyl acrylate, butyl acrylate, and 2-ethylhexyl acrylate; methacrylic acid esters such as methyl methacrylate, butyl methacrylate, and 2-ethylhexyl methacrylate; 2,3-dichloro-1,3-butadiene, 1-chloro-1,3-butadiene, butadiene, isoprene, ethylene, styrene, acrylonitrile, and the derivatives thereof.

Examples of commercially available polychloroprene rubber are, for example, Neoprene WHV and Neoprene W from DuPont; Skyprene G-40S-1, Skyprene Y-30S, and Skyprene 580H from TOSOH Corporation.

In some embodiments of the present invention, the amount of polychloroprene rubber in the acid resistant adhesive composition of the invention is from 5% to 20%, and preferably from 10% to 15% by weight based on the total weight of the composition.

Epoxy Silane

The epoxy silane of the present invention functions as a coupling agent. In some embodiments, the epoxy silane includes at least one epoxidized alkoxysilane, which comprises at least one epoxy group and at least one alkoxy group attached to the silicon atom.

Examples of the epoxy silane are glycidoxypropyl trimethoxysilane, glycidoxypropyl triethoxysilane, beta-(3,4-epoxycyclohexyl)-ethyl trimethoxysilane, 3-methacryloxypropyl trimethoxysilane, 3-methacryloxypropyl triethoxysilane and any combination thereof. Specific example of the epoxy silane is shown below.

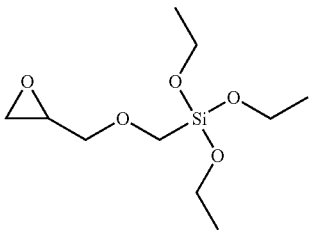 [SMILES: CCO[Si](COCC1CO1)(OCC)OCC]

Examples of commercially available epoxy silane are, for example, KMB 403 from Shin-Etsu Chemical; SILQUEST A187 from Momentive; and Dynasylan GLYMO from Evonik Industries AG.

In some embodiments of the present invention, the amount of the epoxy silane of the invention is from 0.2 to 1° A, and preferably from 0.4 to 0.6% by weight based on the total weight of the composition.

Amino Silane

The amino silane of the present invention functions as a coupling agent. In some embodiments, the amino silane includes at least one amine containing alkoxysilane, which comprises at least one amino group and at least one alkoxy group attached to the silicon atom.

Examples of the amino silane include but not limited to gamma-aminopropyl trimethoxysilane, gamma-aminopropyl triethoxysilane, gamma-aminopropyl triisopropoxysilane, gamma-aminopropylmethyl dimethoxysilane, gamma-aminopropylmethyl diethoxysilane, gamma-(2-aminoethyl) aminopropyl trimethoxysilane, gamma-(6-aminohexyl) aminopropyl trimethoxysilane, N-(2-aminoethyl)-3-aminopropylmethyl dimethoxysilane, N-2-(aminoethyl)-3-aminopropyl trimethoxysilane, 3-aminopropyl triethoxysilane, 4-amino-3,3-dimethylbutyl trimethoxysilane, 4-amino-3,3-dimethylbutyl dimethoxymethylsilane, 3-(N-ethylamino)-2-methylpropyl trimethoxysilane, N-ethyl-3-amino-2-methylpropyl trimethoxysilane, N-ethyl-3-amino-2-methylpropyl diethoxymethylsilane, N-ethyl-3-amino-2-methylpropyl triethoxysilane, N-ethyl-3-amino-2-methylpropylmethyl dimethoxysilane, N-butyl-3-amino-2-methylpropyl trimethoxysilane, N-phenyl-gamma-aminopropyl trimethoxysilane, N-benzyl-gamma-aminopropyl trimethoxysilane, N-vinylbenzyl-gamma-aminopropyl triethoxysilane, and any combination thereof. Specific example of the amino silane is shown below.

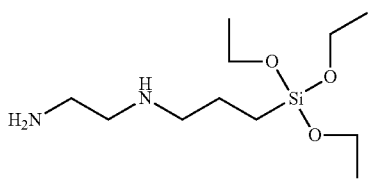 [SMILES: CCO[Si](CCCNCCN)(OCC)OCC]

Examples of commercially available amino silane, for example, are KMB 603 from Shin-Etsu Chemical; SILQUEST A1120 from Momentive; and GENIOSIL GF9 from Wacker Chemie AG.

In some embodiments of the present invention, the amount of the amino silane is from 0.2 to 2%, preferably from 0.4 to 1% by weight based on the total weight of the composition.

Unsaturated Silane

The unsaturated silane of the present invention refers to any common silane containing one or more non-aromatic carbon-carbon double bonds. The unsaturated silane functions as a coupling agent and prefers to be an ethylenically unsaturated alkoxysilane, selecting from the group consisting of vinyltrimethoxysilane, vinyltriethoxysilane, vinyltris(2-methoxyethoxy)silane and any combination thereof.

Commercially available unsaturated silane, for example, are KMB 1003 from Shin-Etsu Chemical; SILQUEST A 171 from Momentive; and Dynasylan VTMO from Evonik Industries AG.

In some embodiments of the present invention, the amount of the unsaturated silane is from 0.2% to 2%, and preferably from 0.4% to 1% by weight based on the total weight of the composition.

Organic Solvent

The organic solvent of the present invention refers to any common organic solvent and may be selected from the group consisting of aromatic solvents, ketone compounds, aliphatic solvents, alicyclic solvents, ester solvents, chlorinated hydrocarbon compounds and any combination thereof.

In some embodiments of the present invention, the organic solvent may be selected from toluene, xylene, acetone, methyl ethyl ketone, hexane, cyclohexane, methyl cyclohexane, ethyl acetate, butyl acetate, dichloromethane, and any combination thereof.

Commercially available organic solvents, for example, are MCH, EA, and CH from SK Chemicals.

In some embodiments of the present invention, the amount of the organic solvent is from 20% to 80%, and preferably from 50% to 75% by weight based on the total weight of the composition.

Other Optional Additives

Tackifier

The tackifier of the present invention refers to any common tackifier and includes but not limited to aliphatic petroleum resin, cyclic petroleum resin, aromatic petroleum resin, gum resin, rosin ester, synthetic terpene resin, natural terpene resin and any combination thereof.

Examples of commercially available tackifiers are, for example, Tamanol 803L from Arakawa Chemical; C100R, C100W, H130R, and H130W from Eastman; H5-1000 and H5-1001 from Henghe China; SU90, SU100, SU120 and SU130 from Kolon Industries; I-Marv P90, I-Marv P100, and I-Marv P120 from Idemitsu; Regalite R1100, Regalite R1120, and Regalite S1100 from Eastman; JH-6100 and JH-6125 from Jinhai Chengguang.

In some embodiments of the present invention, the amount of the tackifier is from 4% to 10%, and preferably from 5% to 7% by weight based on the total weight of the composition.

Adhesion Promoter

The adhesion promoter of the present invention refers to any common adhesion promoter, preferably modified polyolefin, and more preferably chlorinated polyolefin and acrylic modified polyolefin.

In some embodiments of the present invention, the adhesion promoter may be selected from chlorinated polypropylene, acrylic modified polypropylene and any combination thereof.

Examples of commercially available adhesion promoters are, for example, Hardren DX-526P from Toyobo Co., Ltd.; and AUROREN 550S from Nippon Paper Industries Co., Ltd.

In some embodiments of the present invention, the amount of the adhesion promoter is from 0.3% to 10%, and preferably from 0.5% to 6% by weight based on the total weight of the composition.

Stabilizer

The stabilizer of the present invention refers to acrylic modified halogenated polyolefin or methacrylic modified halogenated polyolefin or the combination thereof.

In some embodiments, the stabilizer may be selected from acrylic modified chlorinated polyethylene, acrylic modified chlorinated polypropylene, acrylic modified chlorinated polybutene and any combination thereof.

Commercially available stabilizer, for example, is XM 200 from Changzhou Hengbang Chemical Co., Ltd.

In some embodiments of the present invention, the amount of the stabilizer is from 1% to 5%, and preferably from 2% to 5% by weight based on the total weight of the composition.

Saturated Silane

Without wishing to be bound by any theory, the saturated silane of the present invention may function to absorb water that might present in the acid resistant adhesive composition and prevent the epoxy silane, amino silane and unsaturated silane to react with water. In some embodiments, the saturated silane is saturated alkoxysilane, saturated alkylsilane or the combination thereof.

Examples of the saturated silane include but not limited to tetraethoxysilane, triethoxysilane, tetrapropyloxysilane, tripropyloxysilane and any combination thereof.

Commercially available saturated silane for example, is tetreaethyl orthosilicate from Zhangjiaguang Xinya Chemical Co., Ltd.

In some embodiments of the present invention, the amount of the saturated silane is from 0.2% to 3%, and preferably from 0.5% to 1% by weight based on the total weight of the composition.

Metallic Oxide

The metallic oxide of the present invention refers to any common metallic oxide functioning to enhance the curing of polychloroprene and improve the heat resistance of the acid resistant adhesive. Preferably, the metallic oxide is selected from magnesium oxide, zinc oxide and the combination thereof. More preferably, the magnesium oxide is an active magnesium oxide and the zinc oxide is active zinc oxide.

Commercially available metallic oxides for example, are Kyowamag 150 from Kyowa Chemical Industry Co., Ltd.; and AZO form Seido Chemical Industry Co., Ltd.

In some embodiments of the present invention, the amount of the metallic oxide is from 0.2% to 4%, and preferably from 0.4% to 3% by weight based on the total weight of the composition.

Film Forming Agent

The film forming agent of the present invention includes but not limited to styrene-butadiene-styrene (SBS) block copolymers and styrene-isoprene-styrene (SIS) block copolymers, styrene-ethylene-butylene-styrene (SEBS) block copolymer, styrene-ethylene-propylene-styrene (SEPS) block copolymer, ethylene propylene methylene (EPM), ethylene propylene diene methylene (EPDM) and any combination thereof.

Commercially available film forming agents for example, are Kraton D1102 J and MD 1648 from Kraton.

In some embodiments of the present invention, the amount of the film forming agent is from 0.3% to 2%, and preferably from 0.5% to 1% by weight based on the total weight of the composition.

In a preferred embodiment, the acid resistant adhesive composition comprises:
(a) from 8 to 25% by weight of at least one polychloroprene rubber;
(b) from 0.2 to 1% by weight of at least one epoxy silane;
(c) from 0.2 to 2% by weight of at least one amino silane;
(d) from 0.2 to 2% by weight of at least one unsaturated silane;
(e) from 1 to 5% by weight of at least one stabilizer;
(f) from 4 to 10% by weight of at least one tackifier;
(g) from 0.3 to 10% by weight of at least one adhesion promoter;
(h) from 20 to 80% by weight of at least one organic solvent;
(i) from 0.2 to 3% by weight of at least one saturated silane;
(j) from 0.3 to 2% by weight of at least one film forming agent; and
(k) from 0.2 to 4% by weight of at least one metallic oxide;
wherein the weight percentages of all components add up to 100% by weight.

The acid resistant adhesive composition may be prepared with nitrogen gas protection by steps of:
a) milling polychloroprene rubber;
b) heating the milled polychloroprene rubber with optionally added metallic oxide at a desired temperature which is less than or equal to 85° C. and forming polychloroprene rubber sheet by a roll mill;
c) mixing organic solvent, unsaturated silane, and optionally added saturated silane to form a homogenous mixture;
d) dissolving the polychloroprene rubber sheet from step b) in the homogenous mixture from step c) to form a solution;
e) optionally adding tackifier, adhesion promoter, film forming agent and stabilizer into the solution, and stirring the solution at a desired temperature, for example at a temperature in the range of 25 to 40° C.;
f) mixing epoxy silane and amine silane; and
g) adding the mixture of epoxy silane and amine silane into the solution from step d) or step e).

The initial peel strength of the acid resistant adhesive of the present invention may be assessed by the steps of:

a) forming a laminate by adhering an untreated polymer and a metal with the acid resistant adhesive;
b) heating the laminate for curing the acid resistant adhesive;
c) peeling the untreated polymer and the metal from one another at an angle of 180°; and
d) recording the force as the initial peel strength of the acid resistant adhesive when the untreated polymer and the metal were pulled apart at a predetermined distance.

The final peel strength of the acid resistant adhesive of the present invention may be assessed by the steps of:
a) forming a laminate by adhering an untreated polymer and a metal with the acid resistant adhesive;
b) heating the laminate for curing the acid resistant adhesive;
c) soaking the laminate in an electrolyte solution;
d) taking the laminate out of the electrolyte solution and storing the laminate at 25° C. and 55% relative humidity;
e) peeling the untreated polymer and the metal from one another at an angle of 180°; and
f) recording the force as the final peel strength of the acid resistant adhesive when the untreated polymer and the metal were pulled apart at a predetermined distance.

The storability of the acid resistant adhesive of the present invention may be assessed by the steps of:
a) storing the acid resistant adhesive in a sealed container with nitrogen gas protection;
b) taking the acid resistant adhesive out of the sealed container and measuring the initial peel strength and the final peel strength of the acid resistant adhesive; and
c) ranking the storability of the acid resistant adhesive as "pass" if the final peel strength is greater than or equal to a predetermined percentage of the initiate peel strength and ranking the storability of the acid resistant adhesive as "fail" if the final peel strength is less than the predetermined percentage of the initiate peel strength.

The acid resistant adhesive composition of the present invention has excellent initial peel strength for adhering untreated polymer and metal. Moreover, the final peel strength of the acid resistant adhesive composition does not drop much compared with the initial peel strength after the bonded polymer and metal are soaked in the electrolyte solution indicating the adhesive composition has good acid resistant property. In further embodiments, the acid resistant adhesive composition also has good storability after being stored in a sealed container at 5 to 15° C. for 6 months with nitrogen gas protection.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Test Methods

Initial Peel Strength Test

An aluminium foil and an untreated copolymerized polypropylene film were bonded together by the acid resistant adhesive which was applied at 150g/m² to form a laminate sample. The laminate sample was heated at 80° C. for 2 minutes and cooled at room temperature. The aluminium foil and the untreated copolymerized polypropylene film were peeled from one another at an angle of 180° with a rate of 50 mm/min using Zwick/Roell Z010 (1kN). The initial peel strength test was carried out at 25° C. and 55% relative humidity. The initial peel strength test was made to the laminate sample within 15 minutes after the acid resistant adhesive was applied. The aluminium foil and the untreated copolymerized polypropylene film were pulled 1 cm apart and the force was recorded as the initial peel strength of the acid resistant adhesive.

Final Peel Strength Test

An aluminium foil and an untreated copolymerized polypropylene film were bonded together by the acid resistant adhesive which was applied at 150g/m² to form a laminate sample. The laminate sample was heated at 80° C. for 2 minutes and cooled at room temperature. The laminated sample was soaked in the in the electrolyte solution (JN90652 from Guangzhou Tianci) at 60° C. for two weeks. The laminate sample was taken out of the electrolyte solution and stored at 25° C. and 55% relative humidity for 24 hours. The aluminium foil and the untreated copolymerized polypropylene film were peeled from one another at an angle of 180° with a rate of 50 mm/min using Zwick/Roell Z010 (1kN). The final peel strength test was carried out at 25° C. and 55% relative humidity. The aluminium foil and the untreated copolymerized polypropylene film were pulled 1 cm apart and the force was recorded as the final peel strength of the acid resistant adhesive.

Storability Test

The acid resistant adhesive was stored in a sealed metal container at 5 to 15° C. for 6 months with nitrogen gas protection.

The acid resistant adhesive was taken out from the sealed metal container and tested for the initiate peel strength and final peel strength as previous described.

If the final peel strength was greater than or equal to 60% of the initiate peel strength, the storability of the acid resistant adhesive was ranked as "pass"; and if the final peel strength was less than 60% of the initiate peel strength, the storability of the acid resistant adhesive was ranked as "fail".

Example 1-13

Acid resistant adhesive composition samples were prepared according to Table 1A and 1B, by mixing the components selected from:
polychloroprene rubber (Skyprene 580H, from TOSOH Corporation);
polychloroprene rubber (Skprene G-40S-1, from TOSOH Corporation);
polychloroprene rubber (Skyprene Y-30S, from TOSOH Corporation);
rosin modified phenolic resin (Tamanol 803L, from Arakawa Chemical);
chlorinated polypropylene (Hardren DX-526P, from Toyobo Co., Ltd);
modified polyolefin resin (AUROREN 550S, from Nippon Paper Industries Co., Ltd.);
styrene-butadiene-styrene polymer (Kraton D1102 J, from Kraton);
methylcyclohexane (MCH, from SK Chemicals);
cyclohexane (CH, from SK Chemicals);
ethyl acetate (EA, from SK Chemicals);
active magnesium oxide (Kyowamag 150, from Kyowa Chemical Industry Co., Ltd.);
active zinc oxide (AZO, from Seido Chemical Industry Co., Ltd.);
Vinyltrimethoxysilane (KBM 1003, from Shin-Etsu Chemical);

3-glycidoxypropyl trimethoxysilane (KBM 403, from Shin-Etsu Chemical);
N-(β-aminoethyl)-γ-aminopropyltrimethoxysilane (KBM 603, from Shin-Etsu Chemical);
tetreaethyl orthosilicate (from Zhangjiaguang Xinya Chemical Co., Ltd.);
acrylic modified chlorinated polypropylene (XM-200, from Changzhou Hengbang Chemical Co., Ltd.); and
acrylic modified polyolefin resin (AUROREN 350S, from Nippon Paper Industries Co., Ltd.);

In Table 2A and Table 2B, the performance of the acid resistant adhesive composition is reported. The acid resistant adhesive samples in Example 1 to 4, 9, 11 and 12 had excellent initial peel strength and final peel strength after being soaked in electrolyte solution. Moreover, the final peel strength of the acid resistant adhesive composition did not drop much compared with the initial peel strength.

When the silane compounds were absent from the acid resistant adhesive composition as shown in Example 5, the acid resistant adhesive composition sample had smaller

TABLE 1A

Acid resistant adhesive composition

| Components | Example 1 | Example 2 | Example 3 | Example 4 | Example 5 | Example 6 | Example 7 |
|---|---|---|---|---|---|---|---|
| Skyprene 580H | 5 | 5 | 5 | 5 | 5 | 5 | 5 |
| Skprene G-40S-1 | 5 | 5 | 5 | 5 | 5 | 5 | 5 |
| Skyprene Y-30S | 3.5 | 3.5 | 3.5 | 3.5 | 3.5 | 3.5 | 3.5 |
| Tamanol 803L | 6 | 6 | 6 | 6 | 6 | 6 | 6 |
| Hardlen DX 526P | 0.6 | 0.6 | 0.6 | 0.6 | 0.6 | 0.6 | 0.6 |
| AUROREN 550S | 5 | 5 | 5 | 5 | 5 | 5 | 5 |
| Kraton D1102 J | 0.5 | 0.5 | 0.5 | 0.5 | 0.5 | 0.5 | 0.5 |
| MCH | 25 | 20 | 22 | 20 | 23 | 22 | 21 |
| CH | 23.85 | 23.1 | 23.4 | 20.4 | 23 | 24.05 | 24.05 |
| EA | 22.55 | 25 | 20 | 20 | 24.4 | 23.15 | 24.15 |
| Kyowamag 150 | 0.5 | 0.5 | 0.5 | 0.5 | 0.5 | 0.5 | 0.5 |
| AZO | 0.5 | 0.5 | 0.5 | 0.5 | 0.5 | 0.5 | 0.5 |
| KBM 1003 | 0.5 | 0.6 | 1 | 2 | 0 | 0 | 0.4 |
| KBM 403 | 0.5 | 0.6 | 1 | 1 | 0 | 0.4 | 0 |
| KBM 603 | 0.5 | 0.6 | 1 | 2 | 0 | 0.4 | 0.4 |
| tetreaethyl orthosilicate | 0.5 | 0.5 | 1 | 3 | 0 | 0.4 | 0.4 |
| XM-200 | 2.5 | 3 | 4 | 5 | 3 | 3 | 3 |

TABLE 1B

Acid resistant adhesive composition

| Components | Example 8 | Example 9 | Example 10 | Example 11 | Example 12 | Example 13 |
|---|---|---|---|---|---|---|
| Skyprene 580H | 5 | 5 | 5 | 5 | 5 | 5 |
| Skprene G-40S-1 | 5 | 5 | 5 | 5 | 5 | 5 |
| Skyprene Y-30S | 3.5 | 3.5 | 3.5 | 3.5 | 3.5 | 3.5 |
| Tamanol 803L | 6 | 6 | 6 | 6 | 6 | 6 |
| Hardlen DX 526P | 0.6 | 0.6 | 0.6 | 0.6 | 0.6 | 0.6 |
| AUROREN 550S | 5 | 5 | 5 | 5 | 5 | 5 |
| Kraton D1102 J | 0.5 | 0.5 | 0.5 | 0.5 | 0.5 | 0.5 |
| MCH | 21 | 21.4 | 21 | 24 | 21 | 25 |
| CH | 24 | 23.5 | 22.06 | 23.4 | 21.4 | 21.15 |
| EA | 24.2 | 24.2 | 22.14 | 24 | 23 | 25 |
| Kyowamag 150 | 0.5 | 0.5 | 0.5 | 0.5 | 0.5 | 0.5 |
| AZO | 0.5 | 0.5 | 0.5 | 0.5 | 0.5 | 0.5 |
| KBM 1003 | 0.4 | 0.5 | 0.4 | 0.5 | 0.5 | 0.5 |
| KBM 403 | 0.4 | 0.4 | 0.4 | 0.5 | 0.5 | 0.5 |
| KBM 603 | 0 | 0.4 | 0.4 | 0.5 | 0.5 | 0.5 |
| tetreaethyl orthosilicate | 0.4 | 0 | 4 | 0.5 | 0.5 | 0.5 |
| XM-200 | 3 | 3 | 3 | 0 | 6 | 0 |
| AUROREN 350S | 0 | 0 | 0 | 0 | 0 | 0.25 | initial peel strength compared with the acid resistant adhesive composition samples in Example 1 to 4. In additional, the acid resistant adhesive composition sample in Example 5 showed weak final peel strength, poor acid resistant property, and poor storability.

When the unsaturated silane was absent from the acid resistant adhesive composition as shown in Example 6, the acid resistant adhesive composition sample had smaller initial peel strength compared with the acid resistant adhesive composition samples in Example 1 to 4. In additional, the acid resistant adhesive composition sample in Example 6 showed weak final peel strength and poor acid resistant property.

When the epoxy silane was absent from the acid resistant adhesive composition as shown in Example 7, the acid resistant adhesive composition sample showed weak initial peel strength, weak final peel strength, poor acid resistant property and poor storability.

When the amine silane was absent from the acid resistant adhesive composition as shown in Example 8, the acid resistant adhesive composition sample had smaller initial peel strength compared with the acid resistant adhesive composition samples in Example 1 to 4. In additional, the acid resistant adhesive composition sample in Example 8 showed weak final peel strength, poor acid resistant property and poor storability.

When the saturated silane was absent from the acid resistant adhesive composition as shown in Example 9, the acid resistant adhesive composition sample showed excellent initial peel strength, final peel strength, and acid resistant property, but poor storability. Therefore, the incorporation of the saturated silane can improve the storability of the acid resistant adhesive composition.

When the saturated silane was in excess amount in the acid resistant adhesive composition as shown in Example 10, the acid resistant adhesive composition sample showed extremely weak initial peel strength and final peel strength, but good storability.

When the stabilizer was absent from the acid resistant adhesive composition as shown in Example 11, the acid resistant adhesive composition sample showed excellent initial peel strength, final peel strength and acid resistant property, but poor storability. Therefore, the incorporation of stabilizer can improve the storability of the acid resistant adhesive composition.

When the stabilizer was in excess amount in the acid resistant adhesive composition as shown in Example 12, the acid resistant adhesive composition sample showed excellent initial peel strength, but relatively weak final peel strength, and poor storability.

When the stabilizer was replaced with a non-halogenated acrylic modified polyolefin resin as shown in Example 13, the acid resistant adhesive composition sample had smaller initial peel strength compared with the acid resistant adhesive composition samples in Example 1 to 4. In additional, the acid resistant adhesive composition sample in Example 8 showed weak final peel strength, poor acid resistant property and poor storability.

TABLE 2A

Performance of the acid resistant adhesive composition

| | Example 1 | Example 2 | Example 3 | Example 4 | Example 5 | Example 6 | Example 7 |
|---|---|---|---|---|---|---|---|
| Initial peel strength | 14 | 14 | 14 | 14 | 10 | 10 | 8 |
| Final peel strength | 12 | 12 | 12 | 12 | 2 | 2 | 2 |
| Storability | Pass | Pass | Pass | Pass | Fail | Pass | Fail |

TABLE 2B

Performance of the acid resistant adhesive composition

| | Volume expansion ratio (R) | | | | | |
|---|---|---|---|---|---|---|
| | Example 8 | Example 9 | Example 10 | Example 11 | Example 12 | Example 13 |
| Initial peel strength | 10 | 14 | 3 | 13 | 12 | 10 |
| Final peel strength | 4 | 12 | 0 | 10 | 8 | 5 |
| Storability | Fail | Fail | Pass | Fail | Fail | Fail |

What is claimed is:

1. An acid resistant adhesive composition comprising:
   5 to 25% by weight of at least one polychloroprene rubber;
   from 0.2 to 1% by weight of at least one epoxy silane;
   from 0.2 to 2% by weight of at least one amino silane;
   0.2 to 2% by weight of at least one unsaturated silane;
   from 1 to 5% by weight of a stabilizer;
   from 0 to 10% by weight of a tackifier;
   from 20 to 80% by weight of at least one organic solvent;
   from 0.2 to 3% by weight of a saturated silane; and
   from 0.2 to 4% by weight of a metal oxide;
   wherein the weight percentages of all components add up to 100% by weight.

2. The acid resistant adhesive composition according to claim 1, wherein the epoxy silane is an epoxidized alkoxysilane, selected from glycidoxypropyl trimethoxysilane, glycidoxypropyl triethoxysilane, beta-(3,4-epoxycyclohexyl)-ethyl trimethoxysilane, 3-methacryloxypropyl trimethoxysilane, 3-methacryloxypropyl triethoxysilane and any combination thereof.

3. The acid resistant adhesive composition according to claim 1, wherein the amino silane is an amine containing alkoxysilane, selected from gamma-aminopropyl trimethoxysilane, gamma-aminopropyl triethoxysilane, gamma-aminopropyl triisopropoxysilane, gamma-aminopropylmethyl dimethoxysilane, gamma-aminopropylmethyl diethoxysilane, gamma-(2-aminoethyl)aminopropyl trimethoxysilane, gamma-(6-aminohexyl)aminopropyl trimethoxysilane, N-(2-aminoethyl)-3-aminopropylmethyl dimethoxysilane, N-2-(aminoethyl)-3-aminopropyl trimethoxysilane, 3-aminopropyl triethoxysilane, 4-amino-3,3-dimethylbutyl trimethoxysilane, 4-amino-3,3-dimethylbutyl dimethoxymethylsilane, 3-(N-ethylamino)-2-methylpropyl trimethoxysilane, N-ethyl-3-amino-2-methylpropyl trimethoxysilane, N-ethyl-3-amino-2-methylpropyl diethoxymethylsilane, N-ethyl-3-amino-2-methylpropyl triethoxysilane, N-ethyl-3-amino-2-methylpropylmethyl dimethoxysilane, N-butyl-3-amino-2-methylpropyl trimethoxysilane, N-phenyl-gamma-aminopropyl trimethoxysilane, N-benzyl-gamma-aminopropyl trimethoxysilane, N-vinylbenzyl-gamma-aminopropyl triethoxysilane, and any combination thereof.

4. The acid resistant adhesive composition according to claim 1, wherein the unsaturated silane is an ethylenically unsaturated alkoxysilane, selected from vinyltrimethoxysilane, vinyltriethoxysilane, vinyltris(2-methoxyethoxy)silane and any combination thereof.

5. The acid resistant adhesive composition according to claim 1, wherein the stabilizer is selected from acrylic modified halogenated polyolefin, methacrylic modified halogenated polyolefin and any combination thereof.

6. The acid resistant adhesive composition according to claim 1, wherein the at least one saturated silane isselected from saturated alkoxysilane, saturated alkylsilane and any combination thereof.

7. The acid resistant adhesive composition according to claim 1, further comprising at least one film forming agent, selected from styrene-butadiene-styrene (SBS) block copolymers and styrene-isoprene-styrene (SIS) block copolymers, styrene-ethylene-butylene-styrene (SEBS) block copolymer, styrene-ethylene-propylene-styrene (SEPS) block copolymer, ethylene propylene rubber (EPM), ethylene propylene diene rubber (EPDM) and any combination thereof.

8. An acid resistant adhesive composition, comprising:
   from 8 to 25% by weight of the at least one polychloroprene rubber;
   from 0.2 to 1% by weight of the at least one epoxy silane;
   from 0.2 to 2% by weight of the at least one amino silane;
   from 0.2 to 2% by weight of the at least one unsaturated silane;
   from 0 to 5% by weight of a stabilizer;
   from 4 to 10% by weight of a tackifier;
   from 0.3 to 10% by weight of an adhesion promoter;
   from 20 to 80% by weight of the at least one organic solvent;
   from 0.2 to 3% by weight of a saturated silane;
   from 0.3 to 2% by weight of a film forming agent; and
   from 0.2 to 4% by weight of a metal oxide;
   wherein the weight percentages of all components add up to 100% by weight.

9. A method of preparing the acid resistant adhesive composition according to claim 1, comprising the steps of:
   (a) milling at least one polychloroprene rubber;
   (b) heating the milled at least one polychloroprene rubber with a metal oxide and forming a polychloroprene rubber sheet by a roll mill;
   (c) mixing at least one organic solvent, at least one unsaturated silane, and a saturated silane to form a homogenous mixture;
   (d) dissolving the polychloroprene rubber sheet from step (b) in the homogenous mixture from step (c) to form a solution;
   (e) adding a stabilizer and optionally one or more of a tackifier, an adhesion promoter and a film forming agent into the solution;
   (f) mixing at least one epoxy silane and at least one amino silane; and
   (g) adding the mixture of the at least one epoxy silane and the at least one amino silane into the solution from step (d) or step (e);
   wherein steps (a) to (g) are protected with nitrogen gas.

10. An article bonded by the acid resistant adhesive composition according to claim 1.

11. A battery comprising the acid resistant adhesive composition according to claim 1.

* * * * *

UNITED STATES PATENT AND TRADEMARK OFFICE
CERTIFICATE OF CORRECTION

| | |
|---|---|
| PATENT NO. | : 11,584,871 B2 |
| APPLICATION NO. | : 16/913135 |
| DATED | : February 21, 2023 |
| INVENTOR(S) | : Xinyu Zhang and Qi Chen |

It is certified that error appears in the above-identified patent and that said Letters Patent is hereby corrected as shown below:

In the Specification

Column 3, Line 49-50 change "0.2 to 1° A" to --0.2 to 1%--.

Signed and Sealed this
Thirteenth Day of August, 2024

Katherine Kelly Vidal
Director of the United States Patent and Trademark Office